US012671289B2

(12) United States Patent
Manig et al.

(10) Patent No.: US 12,671,289 B2
(45) Date of Patent: Jun. 30, 2026

(54) ELECTRICAL MACHINE WITH ROTOR SHAFT COOLING CHANNELS

(71) Applicant: Rolls-Royce Deutschland Ltd & Co KG, Blankenfelde-Mahlow (DE)

(72) Inventors: Matthias Manig, Doberlug-Kirchhain (DE); Tobias Schumm, Munich (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 231 days.

(21) Appl. No.: 18/476,095

(22) Filed: Sep. 27, 2023

(65) Prior Publication Data

US 2024/0113584 A1      Apr. 4, 2024

(30) Foreign Application Priority Data

Sep. 30, 2022    (DE) ..................... 10 2022 125 296.5

(51) Int. Cl.
   *H02K 1/32*       (2006.01)
   *H02K 9/08*       (2006.01)

(52) U.S. Cl.
   CPC ................. *H02K 1/32* (2013.01); *H02K 9/08* (2013.01)

(58) Field of Classification Search
   CPC ............. H02K 1/32; H02K 9/08; H02K 9/197
   USPC .......................................................... 310/61
   See application file for complete search history.

(56) References Cited

U.S. PATENT DOCUMENTS

2007/0075596 A1* 4/2007 Hall ........................ H02K 1/32
                                                          310/61
2013/0278091 A1* 10/2013 Ohashi ................... H02K 9/197
                                                          310/58
2019/0181709 A1* 6/2019 Berendes ................. H02K 1/30
2019/0190349 A1* 6/2019 Ito ............................ H02K 9/19
2019/0363609 A1* 11/2019 Barti ...................... H02K 9/197
2020/0398871 A1* 12/2020 Kueter ...................... B61F 3/14
2021/0203202 A1* 7/2021 Yagyu .................... H02K 1/278

FOREIGN PATENT DOCUMENTS

CN        207743782 U      8/2018
CN        210490569 U      5/2020
DE          1992583 U      8/1968
DE         19635196 A1 *   3/1998    ............ H02K 5/203
DE       102014106453 A1   11/2015
DE       102015205724 A1    6/2016
DE       102017202356 A1    8/2018
FR          2980056 A1      3/2013

OTHER PUBLICATIONS

Machine translation of DE-19635196-A1. (Year: 1998).*
Search Report for Germany Application No. DE 10 2022 125 296.5 mailed Jun. 15, 2023.

* cited by examiner

*Primary Examiner* — Michael Andrews
(74) *Attorney, Agent, or Firm* — Lempia Summerfield Katz LLC

(57)        ABSTRACT

An electrical machine is disclosed that has a stator and a rotor. The rotor, spaced apart radially from the stator, is configured to rotate about a longitudinal axis. An air gap extends between the rotor and the stator. The rotor has a rotor shaft having two end faces and a surface. A plurality of permanent magnets is connected to the rotor shaft and adjoin the air gap. The rotor shaft has, spaced apart radially from the air gap, a plurality of cooling channels that extend in the longitudinal direction between the end faces of the rotor shaft.

20 Claims, 5 Drawing Sheets

ELECTRICAL MACHINE WITH ROTOR SHAFT COOLING CHANNELS

The present patent document claims the benefit of German Patent Application No. 10 2022 125 296.5, filed Sep. 30, 2022, which is hereby incorporated by reference in its entirety.

TECHNICAL FIELD

The disclosure relates to an electrical machine and improved cooling embodiments for a rotor of the electrical machine.

BACKGROUND

It is known to cool electrical machines. A known cooling mechanism includes carrying out cooling by way of the air gap between the rotor and the stator of an electrical machine. In electrical machines in which the rotor includes permanent magnets arranged on the outer surface, the permanent magnets may be surrounded by a rotor bandage. The thickness of such a rotor bandage increases as the number of revolutions increases. Because a rotor bandage may include an electrically insulating material, the rotor bandage has low thermal conductivity. A cooling effect by way of the air gap between the rotor and the stator is thus reduced. A metal bandage which may be used as an alternative for holding the permanent magnets may be thicker than a bandage made of an electrically insulating material.

It is further known to carry out cooling of the rotor by way of the inner surface of the rotor. Such cooling also tends to have a low degree of efficiency, because the radial thickness of the rotor acts as thermal resistance.

It is known from FR 2980056 A1 to form cooling air channels on the outer side of the rotor of an electrical machine adjoining the air gap between the rotor and the stator. Such cooling air channels effect a certain increase in the surface area of the rotor surface adjoining the air gap between the rotor and the stator but have limited effectiveness.

SUMMARY AND DESCRIPTION

The present disclosure is based on the object of providing an electrical machine that provides improved cooling of the rotor of an electrical machine.

The scope of the present disclosure is defined solely by the appended claims and is not affected to any degree by the statements within this summary. The present embodiments may obviate one or more of the drawbacks or limitations in the related art.

Accordingly, the present disclosure relates to an electrical machine that includes a stator and a rotor, wherein the rotor, spaced apart radially from the stator, rotates about a longitudinal axis. An air gap extends between the rotor and the stator. The rotor has a rotor shaft (which may also be referred to as a rotor carrier shaft) having two end faces and a surface, and a plurality of permanent magnets that are connected to the rotor shaft and adjoin the air gap.

The rotor shaft has, spaced apart radially from the air gap, a plurality of cooling channels that extend in the longitudinal direction of the rotor shaft between the end faces of the rotor shaft.

The disclosure is based on the idea of providing cooling of the rotor by separately formed cooling channels that extend in the axial direction in the rotor shaft or on the surface of the rotor shaft. Cooling is thus provided that is independent of cooling by way of the air gap and, in particular, is not dependent on the material and thickness of a rotor bandage. The cooling provided by way of the cooling channels may supplement cooling by way of the air gap or even replace it (if the air gap is made very small). The cooling medium may be any gaseous substance supplied to the rotor shaft at one end face and removed at the other end face, wherein the cooling medium flows through the cooling channels, which are open at their axial ends.

The solution allows a rotor to be cooled actively and thus effectively, because the magnet pack including the plurality of permanent magnets is cooled directly and heat does not have to be transported away solely by way of the air gap between the rotor and the stator. The amount of cooling medium required may thus also be minimized. Furthermore, as a result of minimized temperature fluctuation and better cooling of the magnet pack, demagnetization of the edge layers is reduced, which contributes towards stabilizing the magnetic field and significantly increases the efficiency of the electrical machine. This in turn allows the size of the electrical machine to be reduced.

The electrical machine may be an internal rotor, in which the rotor is surrounded by the stator, or an external rotor, in which the stator is surrounded by the rotor.

In one embodiment, the cooling channels are configured as elongate bores in the rotor shaft, which extend, spaced apart radially from the surface of the rotor shaft, between the end faces of the rotor shaft, (e.g., radially internally relative to the surface in the case of an internal rotor or radially externally relative to the surface in the case of an external rotor). The mentioned surface of the rotor shaft is the outer lateral surface of the rotor shaft in the case of an internal rotor or the inner lateral surface of the rotor shaft in the case of an external rotor. This embodiment is associated with the advantage that cooling takes place in the material of the rotor shaft, so that heat may effectively be transported away through the cooling channels. The cooling channels may be produced, for example, by drilling, when the cooling channels run linearly, or by spark erosion, optionally in combination with drilling, when the cooling channels run in partially curved form.

In a further embodiment, the cooling channels are configured as elongate depressions in the surface of the rotor shaft. The elongate depressions are formed, for example, by elongate grooves that may have a semi-circular or a rectangular cross section. The elongate depressions radially outwardly adjoin the permanent magnets or an intermediate layer with which the permanent magnets are connected. This embodiment is associated with the advantage that the depressions may be formed in the rotor shaft in a comparatively simple manner, (e.g., by milling or spark erosion), wherein profiles that differ from a linear profile may also be achieved in a simple manner. A further advantage is that the cooling channels are formed adjacent to the permanent magnets, so that they are able to cool the permanent magnets in a particularly effective manner.

In one embodiment, the permanent magnets adjoin the surface of the rotor shaft directly. They may be formed by disc-shaped permanent magnets that are seated on the rotor shaft and are arranged directly one behind the other in the axial direction. In other embodiments, permanent magnets that extend in the axial direction may be used.

In one embodiment, the permanent magnets are connected with an intermediate layer formed on the surface of the rotor shaft. Such an intermediate layer, which serves for fastening the permanent magnets, is also referred to as a magnet yoke.

The mentioned intermediate layer includes a non-conducting and non-magnetic/magnetizable material such as a ceramics-based composite material or a polymer-based composite material, (e.g., glass fiber reinforced plastics material). The use of an intermediate layer is optional and depends on the boundary conditions of the electrical machine, for example, the number of revolutions and the forces acting on the permanent magnets.

If an intermediate layer is present, it is provided that the elongate depressions on the surface of the rotor shaft are formed radially internally relative to the intermediate layer.

In a further embodiment, a compressor stage is arranged spaced apart axially from the rotor shaft and is configured to provide a fluid flow through the cooling channels. The compressor stage includes an impeller and a stator. A plurality of compressor stages may also be arranged one behind the other. By using a compressor stage, a constant fluid supply for the cooling channels is provided. The compressor stage may be arranged, based on the direction of flow, axially before the cooling channels or axially after the cooling channels. In the first case (i.e., before the cooling channels), the compressor stage applies pressure to the cooling fluid so that the cooling fluid flows through the cooling channels. In the second case (i.e., after the cooling channels), the compressor stage generates a negative pressure at the outlet of the cooling channels, which again leads to a fluid flow through the cooling channels.

The impeller of the compressor stage is formed by an impeller blade ring, the impeller blades of which adjoin one another in the circumferential direction. The impeller may be coupled with the rotor shaft directly or by way of a transmission. A separate drive for the impeller may in principle also be provided.

According to one embodiment, the stator may correspondingly be configured as a diffuser having a plurality of diffuser vanes adjoining one another in the circumferential direction. In an alternative embodiment, the stator is configured as a shaped part with integrated fluid channels that are associated on the inlet side with the impeller and on the outlet side with the cooling channels. The embodiment of the stator of the compressor stage as a shaped part allows the air accelerated by the impeller to be compressed and purposively guided to the end-face inlet of the cooling channels. It may be provided, for example, that the shaped part forms at its axially rear end, which adjoins the cooling channels, a circular air gap, which is arranged opposite the inlet of the cooling channels.

In a further embodiment, a further shaped part with integrated fluid channels is arranged upstream of the impeller, wherein, by way of the further shaped part, a cooling fluid is already supplied to the impeller in a defined direction, so that the accelerated and compressed air may be supplied more effectively to the cooling channels of the rotor shaft.

The mentioned shaped parts with integrated fluid channels may be produced, for example, by 3D printing.

Instead of providing a compressor stage, in certain embodiments, a pressurized cooling fluid may be generated externally and is provided to the electrical machine by way of a port. The cooling fluid may be distributed from the mentioned port to the cooling channels by way of a shaped part with integrated fluid channels.

The electrical machine may be formed as an open construction without a housing. Nevertheless, in certain embodiments, the electrical machine is arranged in a housing having axially spaced apart end plates in which the rotor shaft is mounted, wherein one of the end plates has at least one fluid inlet and the other of the end plates has at least one fluid outlet. A compressor stage may be arranged inside the housing. The electrical machine is thus independent in its operation of the external supply of a pressurized cooling fluid. If a compressor stage is provided, it is connected on the inlet side to the fluid inlet of the one end plate.

In other embodiments, a compressor stage or other compression device or mechanism is arranged outside the housing. In such a case, the fluid inlet of the one end plate forms a port for providing a pressurized fluid.

In a further embodiment, an auxiliary plate is arranged on at least one of the end faces of the rotor shaft, which auxiliary plate has aerodynamically curved fluid channels by way of which a cooling fluid may be deflected in such a manner that it acquires a directional component in the direction of rotation of the rotor shaft. The rotor shaft and thus the cooling channels rotate with a high number of revolutions. In order to effectively blow cooling fluid into the cooling channels, it is therefore desirable to accelerate the cooling fluid in the circumferential direction. The auxiliary plate serves for this purpose, wherein the fluid channels integrated into the auxiliary plate form a kind of pre-swirl nozzles which deflect the inflowing cooling fluid in the direction of rotation and in so doing provide the cooling fluid with a swirl. The swirl that is generated reduces aerodynamic losses when the cooling fluid is blown into the cooling channels.

The need to use such an auxiliary plate depends on the diameter of the cooling channels and on the number of revolutions of the electrical machine. In the case of low numbers of revolutions and large diameters of the cooling channels, an auxiliary plate with integrated, aerodynamically curved fluid channels is not necessarily required.

Alternatively, or additionally, in order to blow cooling fluid into the cooling channels with low losses, the cooling channels themselves may be aerodynamically shaped at least on the inlet side and thus may have a directional component in the circumferential direction. A corresponding shaping is unproblematic in the case of cooling channels that are formed on the surface of the rotor shaft. In the case of cooling channels that run inside the rotor shaft, such a shaping may be provided, for example, by spark erosion.

In other embodiments, the cooling channels run linearly between the two end faces, for example, when cooling fluid may be blown in with sufficiently low losses by the mentioned auxiliary plate with aerodynamically curved fluid channels.

A further embodiment provides that the rotor shaft is formed in one piece. The rotor shaft is accordingly not formed by segmented sheets but is machined from solid material, which is built up from the inside out.

In an embodiment, the permanent magnets of the rotor are surrounded and radially fixed by a bandage. The material of the rotor bandage may be selected independently of its thermal conductivity because sufficient cooling of the rotor is already provided by way of the cooling channels of the rotor shaft.

The electrical machine may be an electric motor or a permanent magnet synchronous motor. In the case of a permanent magnet synchronous motor, the stator is fitted with coils, while external permanent magnets are mounted on the rotor.

BRIEF DESCRIPTION OF THE DRAWINGS

The disclosure is explained in greater detail below by a plurality of embodiments with reference to the figures. In the figures.

DETAILED DESCRIPTION

The disclosure is explained below by embodiments in which air is used as the cooling fluid. However, this is to be understood only by way of example. A different gas may also be used as the cooling fluid. The disclosure is also described with reference to an electrical machine configured as an internal rotor. The principles of the present disclosure may be implemented in a corresponding manner in an electrical machine configured as an external rotor.

Figure 1:
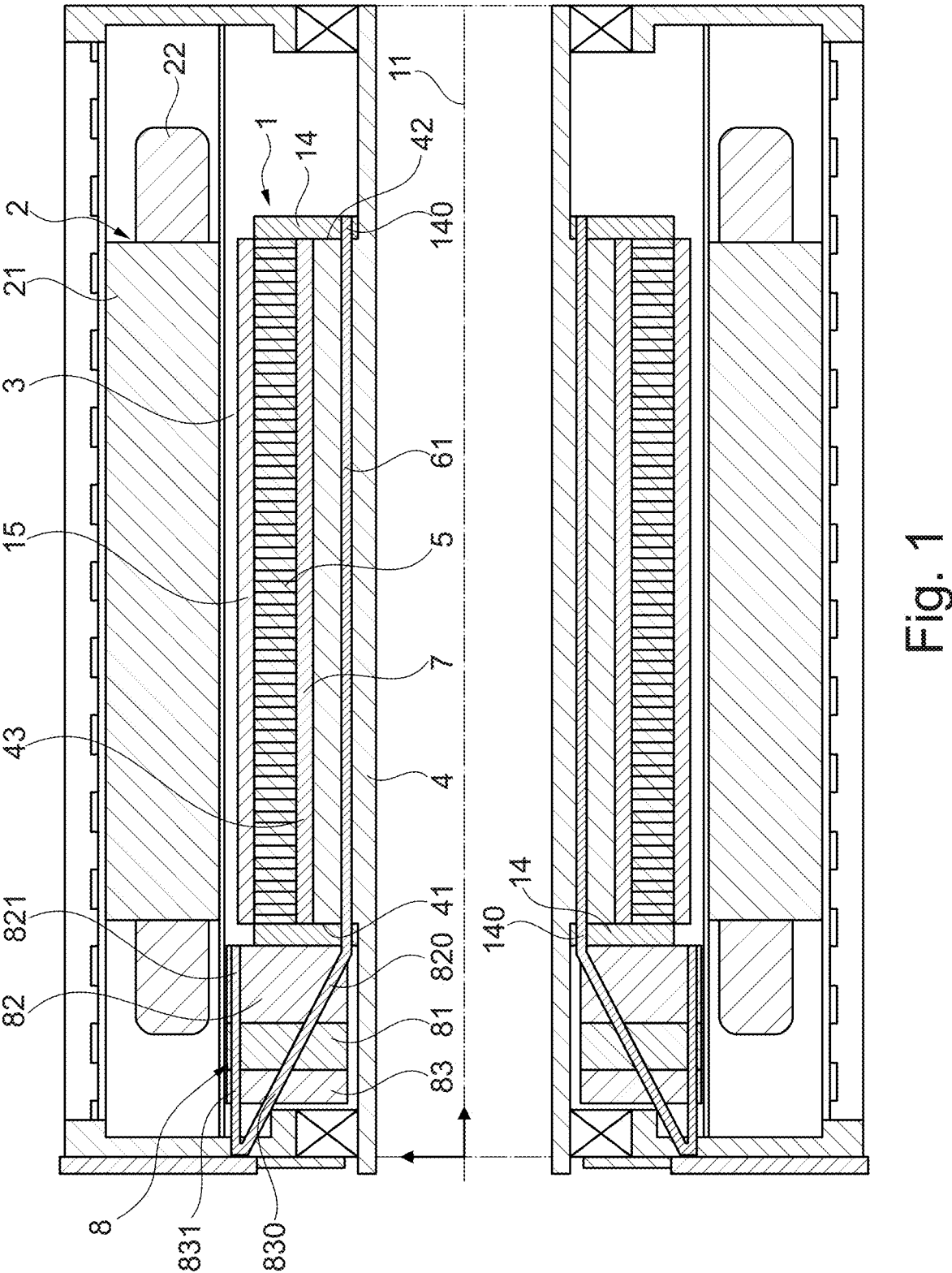
FIG. 1 depicts, in a sectional view, an embodiment of an electric motor that has a rotor including a rotor shaft and permanent magnets, wherein longitudinally extending cooling channels are formed inside the rotor shaft, and the electric motor has an integrated compressor stage for providing a fluid flow through the cooling channels.

FIG. 1 shows an electrical machine which is operated as an electric motor, which however, with fundamentally the same construction, may also be a generator. The electric motor includes a stator 2 and a rotor 1. The stator 2 is shown only schematically and includes a stator yoke 21, which may include laminated teeth and a plurality of coils 22. The exact construction of the stator 2 is not relevant in the present context, so that the stator may implement a large number of structural forms.

The rotor 1 is arranged on the inside of the stator 2 and rotates about a longitudinal axis, or rotational axis 11, which defines an axial direction. It is an internal rotor 1. An axially extending air gap 3 (not shown to scale) is formed between the stator 2 and the rotor 1.

In the longitudinal section of FIG. 1, which passes through the longitudinal axis 11, both the upper half and the lower half of the electric motor are shown, wherein the electric motor is rotationally symmetrical, and the two halves are accordingly mirror-symmetrical. For better clarity of the representation, reference signs in each case denote only elements of one of the two halves. This also applies to FIGS. 2 to 5.

The rotor 1 includes a rotor shaft 4 and a plurality of disc-shaped, segmented permanent magnets 5, which are arranged externally on the rotor 1 and one behind the other in the axial direction. The magnetic polarity of the permanent magnets 5 is formed in a manner known per se. For example, the permanent magnets 5 alternately have opposite polarity in the circumferential direction, or groups of permanent magnets alternately have opposite polarity in the circumferential direction. This is not important in the present context. The number of permanent magnets 5 is also not important either.

The rotor shaft 4 has two end faces 41, 42 and a surface 43 formed by the outer lateral surface of the rotor shaft 4. The end faces 41, 42 are formed, for example, by two terminal rings, which prevent the permanent magnets 5 from becoming free in the axial direction. However, the rotor shaft 4 in the exemplary embodiment shown is not necessarily hollow on the inside and accordingly forms a hollow cylinder. The rotor shaft 4 may include iron or a non-conducting material. It may be formed in one piece. The rotor shaft 4 may also be referred to as a rotor carrier shaft.

Radially externally on the surface 43 of the rotor shaft 4 there is formed an intermediate layer 7, which includes a non-conducting and non-magnetic or magnetizable material and is configured to fix the permanent magnets 5 radially internally. The intermediate layer 7 may include a non-conducting composite material and may also be referred to as a magnet yoke. The permanent magnets 5 are fastened, (e.g., adhesively bonded), to the intermediate layer 7 and connected in this manner to the rotor shaft 4. They are fixed radially externally by a bandage 15. The bandage 15 is formed, for example, by a glass sleeve or a carbon fiber sleeve. Alternatively, a metallic bandage 15 may also be used. As a result of the bandage 15, there is a contact pressure on the magnets 5.

The intermediate layer 7 is optional and in other embodiments the permanent magnets 5 are directly connected radially internally to the surface 43 of the rotor shaft 4.

The rotor shaft 4 includes a plurality of cooling channels 61, which extend in the longitudinal direction of the rotor shaft 4 between the end faces 41, 42 of the rotor shaft 4. The cooling channels 61 are open at their axial ends, so that air is able to enter at one end of the cooling channel 61 and leave again at the other end of the cooling channel 61. The cooling channels 61 extend radially internally relative to the surface 43 of the rotor shaft 4 and inside the rotor shaft 4. Accordingly, they also extend spaced apart radially from the air gap 3. They are separate cooling channels formed independently of and in addition to the air gap 3.

The electrical machine further includes a compressor stage 8, which has an impeller 81 and a stator 82 as well as an element 83 arranged upstream of the impeller 81. The impeller 81 is provided in a manner known per se by a fan wheel, for example, of the BLISK type. The impeller 81 is driven by the rotor shaft 4 directly or by way of a transmission (not shown separately). The stator 82 may be configured as a diffuser vane ring. In the embodiment shown, the stator 82 is in the form of a shaped part that has been produced, for example, by 3D printing. Fluid channels 820 are integrated into the shaped part, which fluid channels are open on the inlet side to the impeller 81 and on the outlet side to the cooling channels 61. By the fluid channels 820, the air drawn in and accelerated by the impeller 81 is compressed and guided to the inlet of the cooling channels 61. There may additionally be integrated into the shaped part fluid channels 821 that supply some of the air accelerated by the impeller 81 to the air gap 3 in order also to generate an air flow in the air gap.

The element 83 arranged upstream of the impeller 81 is likewise configured as a shaped part with integrated fluid channels 830. It serves to supply inflowing air with a defined direction to the impeller 81. Further fluid channels 831 that serve to supply air to the air gap 3 may also be formed in the upstream element 83. The upstream element 83 is optional.

By the compressor stage 8, cooling air is compressed and provided in pressurized form to the cooling channels 61.

The stator, or the shaped part 82, is naturally configured to be non-rotating. By contrast, the rotor shaft 4, and with it also the cooling channels 61 formed therein, rotates. In order to provide that air is effectively blown into the cooling channels 61, devices or mechanisms that deflect the air in the direction of rotation of the rotor shaft 4 may be provided. To this end, in one embodiment, an auxiliary plate 14 is arranged on the front end face 41 of the rotor shaft 4, wherein the auxiliary plate 14 has aerodynamically curved fluid channels 140 by way of which air flowing out of the cooling channels 820 of the shaped part 82 experiences a directional component in the direction of rotation of the rotor shaft 4. By the fluid channels 140, the air is provided with a swirl. The representation of the fluid channels 140 of the auxiliary plate 14 is only schematic in this respect.

Optionally, a corresponding auxiliary plate 14 may also be provided at the axially rear end face 42. This has the effect that the air leaving the cooling channels 61 is freed of its swirl and leaves the electrical machine substantially in the axial direction.

In certain embodiments, alternatively or additionally, the fluid channels 820 in the shaped part 82 are also shaped in such a manner that they provide the air with a swirl in the direction of rotation of the rotor shaft 4. A further embodiment provides that the cooling channels 61 themselves (deviating from a wholly linear extent) are aerodynamically shaped, at least adjacent to the front end face 41, in such a manner that the air provided by the compressor stage 8 may effectively be blown into the cooling channels 61.

The electrical machine shown in FIG. 1 is a permanent magnet synchronous motor. During operation, an AC voltage is applied to the stator coils, this causing them to form a magnetic field when current is flowing, the magnetic field circulating continuously due to the three-phase nature of the current. A further magnetic field is formed by the permanent magnets 5 of the rotor 2.

Figure 2:
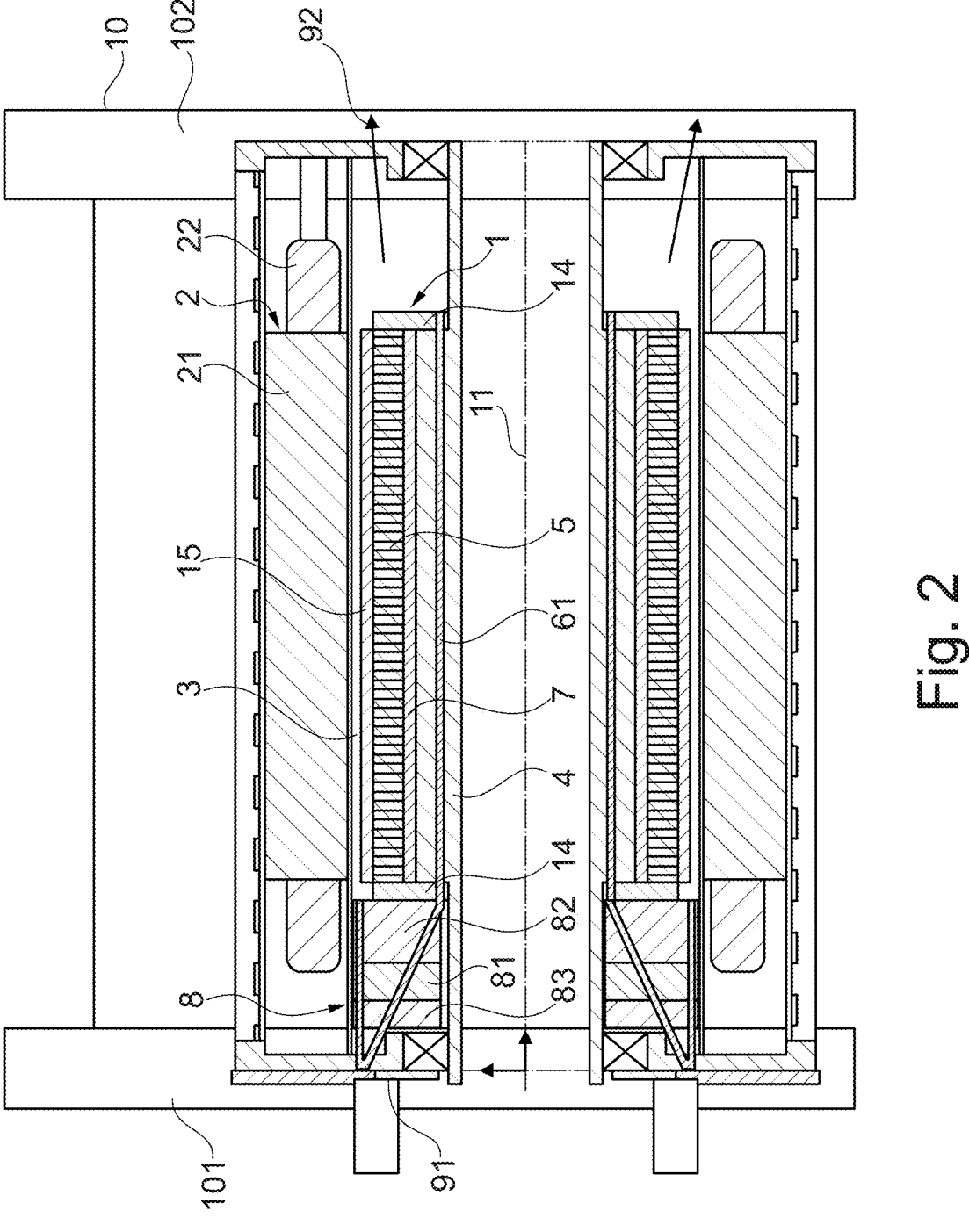
FIG. 2 depicts, in a sectional view, an example of a housing having an electric motor according to FIG. 1.

FIG. 2 shows the electrical machine of FIG. 1 arranged in a housing 10. The housing 10 may be configured as a closed housing and may include an axially front end plate 101 and an axially rear end plate 102. The rotor shaft 4 extends between the end plates 101, 102 and is mounted therein. The axially front end plate 101 includes a fluid inlet 91, and the axially rear end plate 102 includes a fluid outlet 92. The compressor stage 8, namely the shaped part 83 thereof, is connected on the inlet side to the fluid inlet 91.

Figure 3:
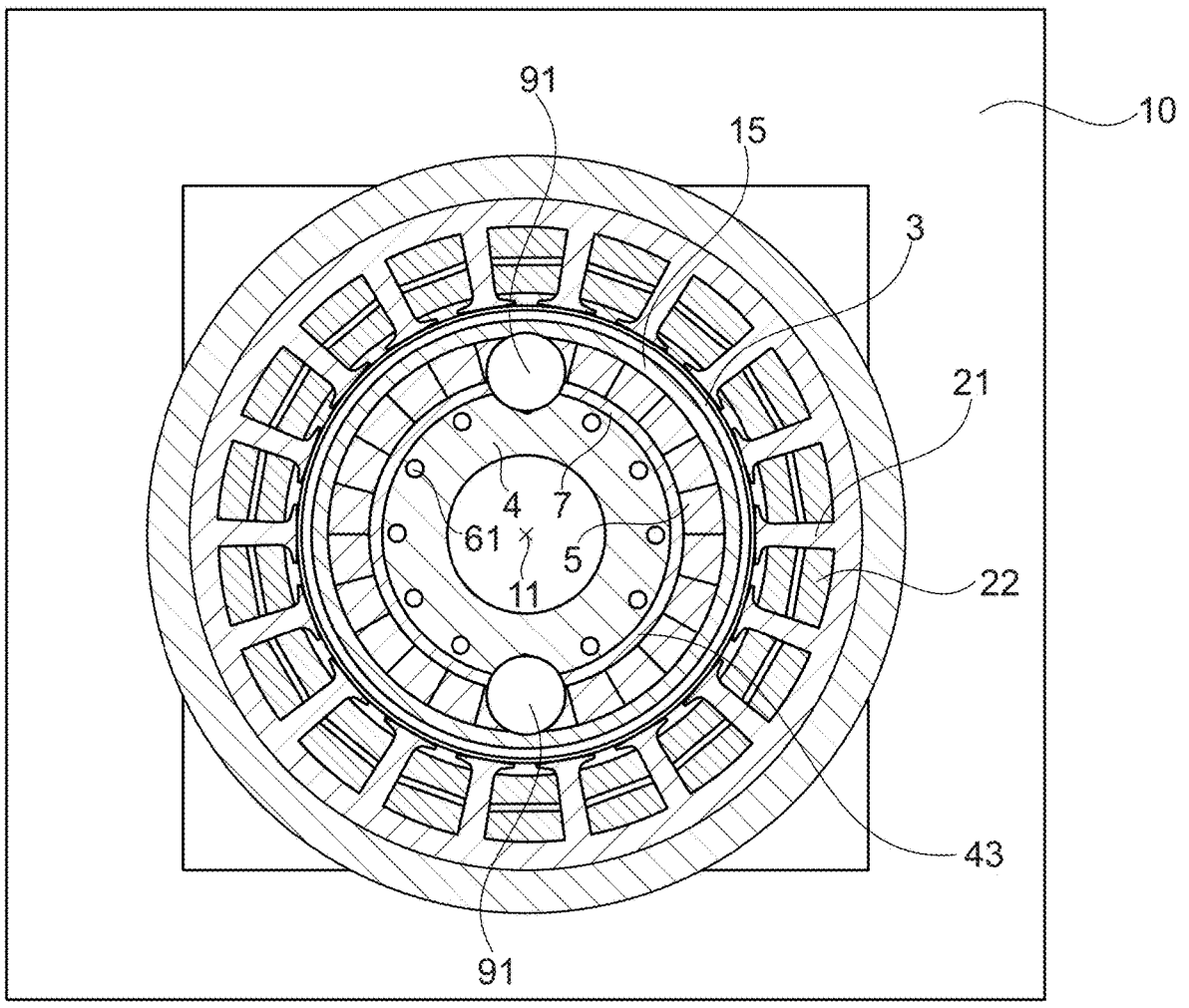
FIG. 3 depicts the housing and the electric motor of FIGS. 1 and 2 in a view from the front showing the rotor and the stator of the electric motor.

FIG. 3 shows the electrical machine of FIG. 1 and the housing of FIG. 2 in a view from the front, wherein the elements forming the compressor stage 8 are not shown. The cooling channels 61, which extend, spaced apart radially from the surface 43 of the rotor shaft 4, in the axial direction inside the rotor shaft 4 may clearly be seen. Two fluid inlets 91, which are formed on the axially front end plate 101, are further shown schematically.

Figure 4:
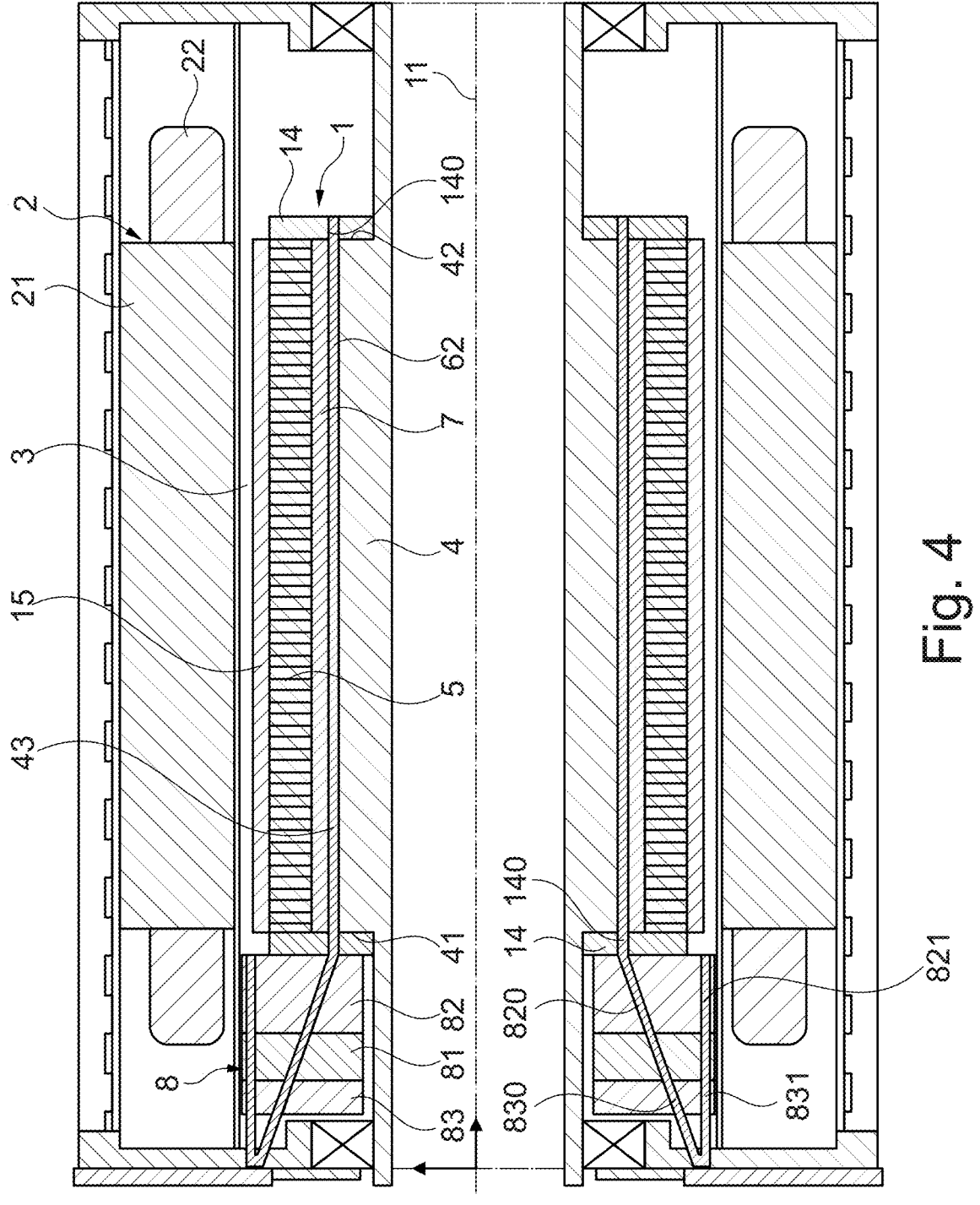
FIG. 4 depicts, in a sectional view, a further embodiment of an electric motor that has a rotor including a rotor shaft and permanent magnets, wherein longitudinally extending cooling channels are formed on the surface of the rotor shaft, and the electric motor has an integrated compressor stage for providing a fluid flow through the cooling channels.

FIG. 4 shows a further exemplary embodiment of an electrical machine, which differs from the exemplary embodiment of FIGS. 1-3 in that the cooling channels do not run in the interior of the rotor shaft 4 but on the surface thereof. Cooling channels 62, which are configured as elongate depressions in the upper side 43 of the rotor shaft 4, are thus provided. Otherwise, reference may be made to the description of FIGS. 1-3.

The cooling channels 62 may be formed, for example, by semi-circular or rectangular grooves in the upper side 43 of the rotor shaft 4. The cooling channels 62 are delimited radially outwardly by the intermediate layer 7. If there is no intermediate layer 7, the cooling channels 62 are delimited radially outwardly by the radially inner end of the permanent magnets 5. The cooling channels 62 may be configured with great freedom in their shaping (both in respect of their cross-sectional shape and in respect of any shaping in the longitudinal direction), for example, by milling or spark erosion at the surface 43. In certain embodiments, the cooling channels 62 are aerodynamically shaped adjacent to the axially front end face 41.

Owing to the changed radial position of the cooling channels 62 compared to FIGS. 1-3, the fluid channels 820, 830 formed in the shaped parts 82, 83 also have a different profile.

Figure 5:
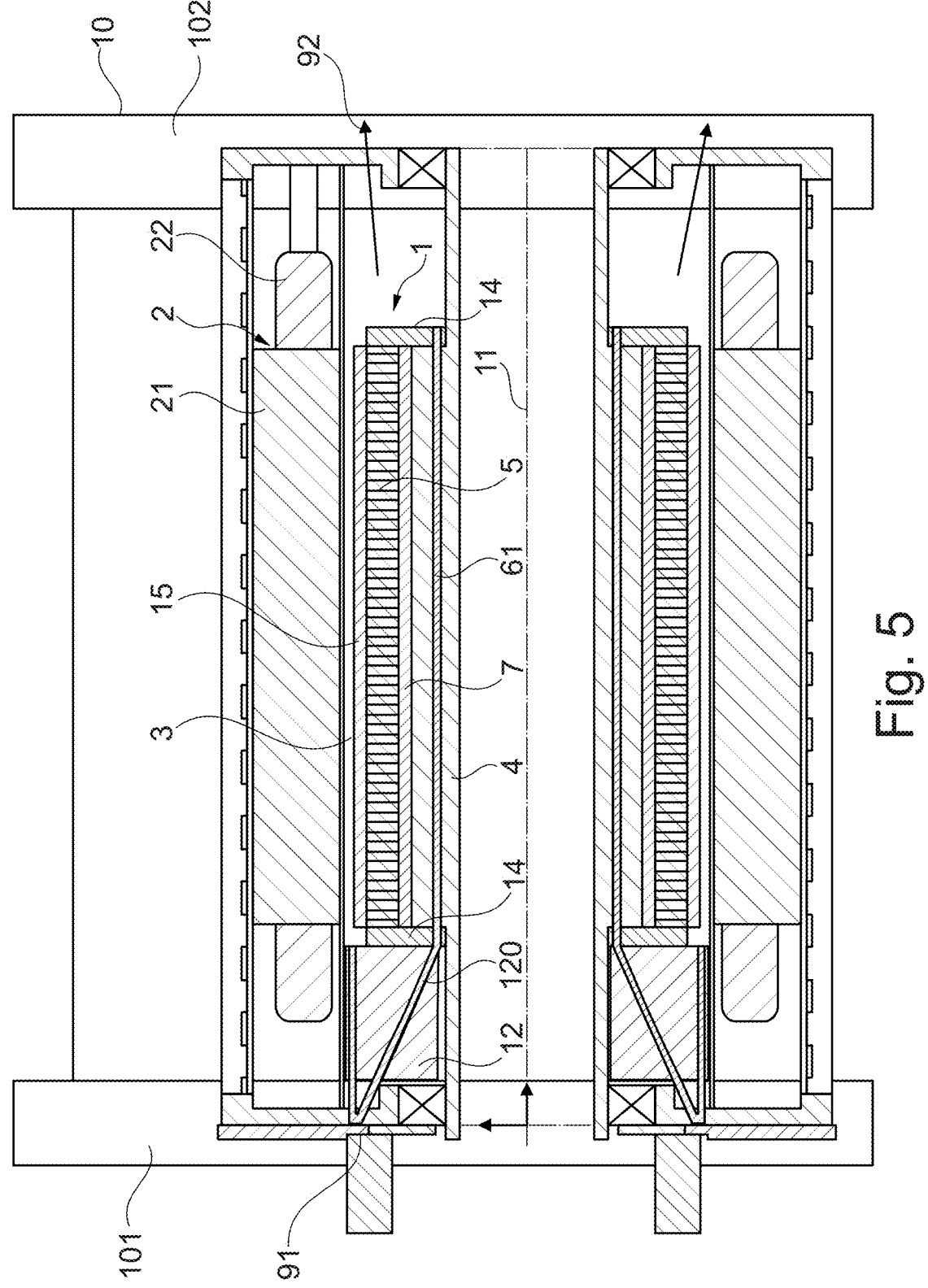
FIG. 5 depicts, in a sectional view, a further embodiment of an electric motor that has a rotor including a rotor shaft and permanent magnets, wherein longitudinally extending cooling channels are formed inside the rotor shaft, and the electric motor has a port for a pressurized cooling fluid for providing a fluid flow through the cooling channels.

FIG. 5 shows a further exemplary embodiment of an electrical machine, which differs from the exemplary embodiment of FIGS. 1-3 by the fact that a compressor stage 8 is not provided, and instead pressurized air is supplied from the outside. Otherwise, reference may be made to FIGS. 1-3.

Thus, according to FIG. 5, the electrical machine has a port 91 by way of which pressurized air is provided. The port 91 is the fluid inlet of the axially front end plate 101 of the housing 10. Adjacent to the port 91 is a shaped part 12 into which fluid channels 120 are integrated and which has been produced, for example, by 3D printing. The fluid channels 120 are associated on the outlet side with the cooling channels 62. In other words, the fluid channels 120 guide the pressurized air received through the port 91 to the cooling channels 61 or to the axially front auxiliary plate 14, which has aerodynamically curved fluid channels 140 that, as has been explained with reference to FIG. 1, impart a swirl to the cooling air.

The disclosure is not limited to the embodiments described above, and various modifications and improvements may be made without departing from the concepts described here. For example, the compressor stage 8 of FIGS. 1-4 may alternatively be arranged axially behind the rotor shaft and draw in air.

It is to be understood that the elements and features recited in the appended claims may be combined in different ways to produce new claims that likewise fall within the scope of the present disclosure. Thus, whereas the dependent claims appended below depend on only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. An electrical machine comprising:
   a stator;
   a rotor spaced apart radially from the stator, wherein the rotor is configured to rotate about a longitudinal axis, and wherein the rotor comprises a rotor shaft having a first end face, a second end face, and a surface;
   a shaped part having integrated fluid channels within the shaped part extending between a first end of the shaped part and a second end of the shaped part, wherein the shaped part is configured to be non-rotating; and
   a gap extending between the rotor and the stator,
   wherein permanent magnets are connected to the rotor shaft and adjoin the gap, wherein the rotor shaft has, spaced apart radially from the gap, cooling channels extending in a longitudinal direction of the rotor shaft between the first end face and the second end face of the rotor shaft, wherein the shaped part is positioned upstream and adjacent to the first end face of the rotor shaft along the longitudinal direction such that an entirety of each integrated fluid channel of the integrated fluid channels within the shaped part is positioned upstream of the first end face and the cooling channels of the rotor shaft, and wherein the shaped part is configured to provide fluid flow to the cooling channels of the rotor shaft at the first end face via the integrated fluid channels of the shaped part.

2. The electrical machine of claim 1, wherein the cooling channels are configured as elongate bores in the rotor shaft, which extend, spaced apart radially from the surface of the rotor shaft, between the first end face and the second end face of the rotor shaft.

3. The electrical machine of claim 1, wherein the cooling channels are configured as elongate depressions in the surface of the rotor shaft.

4. The electrical machine of claim 1, wherein the permanent magnets adjoin the surface of the rotor shaft directly.

5. The electrical machine of claim 1, further comprising:
an intermediate layer of non-conducting material extending between the surface of the rotor shaft and the permanent magnets,
wherein the intermediate layer is configured to fasten the permanent magnets.

6. The electrical machine of claim 5, wherein the cooling channels are configured as elongate depressions in the surface of the rotor shaft, and
wherein the elongate depressions are formed radially internally relative to the intermediate layer.

7. The electrical machine of claim 1, further comprising:
a compressor stage spaced apart axially from the rotor shaft,
wherein the compressor stage is configured to provide the fluid flow through the cooling channels, and
wherein the compressor stage comprises an impeller and a stator.

8. The electrical machine of claim 7, wherein the integrated fluid channels of the shaped part are associated on an inlet side with the impeller and on an outlet side with the cooling channels.

9. The electrical machine of claim 7, further comprising:
a further shaped part arranged upstream of the impeller,
wherein the further shaped part comprises integrated fluid channels by way of which a cooling fluid is supplied in a defined direction to the impeller.

10. The electrical machine of claim 1, further comprising:
a port configured to provide a pressurized fluid and guide the pressurized fluid through the cooling channels.

11. The electrical machine of claim 10, wherein the integrated fluid channels of the shaped part are associated on an inlet side with the port for providing the pressurized fluid and on an outlet side with the cooling channels.

12. The electrical machine of claim 1, wherein the electrical machine is arranged in a housing having a plurality of axially spaced apart end plates in which the rotor shaft is mounted, and
wherein one end plate of the plurality of axially spaced apart end plates has at least one fluid inlet configured to provide fluid flow to the integrated fluid channels of the shaped part and the other end plates of the plurality of axially spaced apart end plates has at least one fluid outlet.

13. The electrical machine of claim 12, further comprising:
a compressor stage spaced apart axially from the rotor shaft,
wherein the compressor stage is configured to provide the fluid flow through the cooling channels,
wherein the compressor stage comprises an impeller and a stator, and
wherein the compressor stage is arranged inside the housing.

14. The electrical machine of claim 13, wherein the compressor stage is connected on an inlet side with the at least one fluid inlet of the one end plate.

15. The electrical machine of claim 12, further comprising:
a port configured to provide a pressurized fluid and guide the pressurized fluid through the cooling channels,
wherein the fluid inlet forms the port for providing the pressurized fluid.

16. The electrical machine of claim 1, wherein the cooling channels run linearly between the first end face and the second end face of the rotor shaft.

17. The electrical machine of claim 1, wherein the cooling channels are aerodynamically shaped adjacent to the first end face and/or the second end face.

18. The electrical machine of claim 1, wherein the permanent magnets of the rotor are surrounded and radially fixed by a bandage.

19. An electrical machine comprising:
a stator;
a rotor spaced apart radially from the stator, wherein the rotor is configured to rotate about a longitudinal axis, and wherein the rotor comprises a rotor shaft having a first end face, a second end face, and a surface;
a shaped part having integrated fluid channels within the shaped part, wherein the shaped part is configured to be non-rotating;
a gap extending between the rotor and the stator; and
an auxiliary plate arranged on the first end face of the rotor shaft,
wherein permanent magnets are connected to the rotor shaft and adjoin the gap,
wherein the rotor shaft has, spaced apart radially from the gap, cooling channels extending in a longitudinal direction of the rotor shaft between the first end face and the second end face of the rotor shaft,
wherein the shaped part is positioned adjacent to the first end face of the rotor shaft along the longitudinal direction,
wherein the shaped part is configured to provide fluid flow to the cooling channels of the rotor shaft at the first end face,
wherein the auxiliary plate is positioned between the shaped part and the first end face of the rotor shaft along the longitudinal direction, and
wherein the auxiliary plate has fluid channels configured receive the fluid flow from the integrated fluid channels of the shaped part and distribute the fluid flow to the cooling channels of the rotor shaft along the longitudinal direction.

20. The electric machine of claim 19, wherein the fluid channels of the auxiliary plate are aerodynamically curved fluid channels by which a cooling fluid is configured to be deflected in a circumferential direction such that the cooling fluid acquires a directional component in a direction of rotation of the rotor shaft.

\* \* \* \* \*